(12) United States Patent
Jacumet

(10) Patent No.: US 8,070,292 B2
(45) Date of Patent: Dec. 6, 2011

(54) VIEWFINDER SYSTEM FOR A CAMERA

(75) Inventor: Klaus Jacumet, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 418 days.

(21) Appl. No.: 12/226,336

(22) PCT Filed: Apr. 11, 2007

(86) PCT No.: PCT/EP2007/003357
§ 371 (c)(1),
(2), (4) Date: Oct. 14, 2008

(87) PCT Pub. No.: WO2007/118701
PCT Pub. Date: Oct. 25, 2007

(65) Prior Publication Data
US 2010/0265464 A1    Oct. 21, 2010

(30) Foreign Application Priority Data

Apr. 13, 2006    (DE) .......................... 10 2006 018 865

(51) Int. Cl.
*G03B 13/02* (2006.01)
(52) U.S. Cl. .......... 352/204; 352/244; 396/51; 396/373; 348/333.01
(58) Field of Classification Search ............. 348/333.09, 348/333.01, 115, 121; 396/51, 121, 147, 396/283, 373; 352/204, 244
See application file for complete search history.

(56) References Cited

U.S. PATENT DOCUMENTS

| | | | | |
|---|---|---|---|---|
| 4,386,835 A | * | 6/1983 | Inoue | 396/271 |
| 4,498,750 A | | 2/1985 | Suzuki et al. | |
| 5,182,443 A | * | 1/1993 | Suda et al. | 250/201.2 |
| 5,280,312 A | * | 1/1994 | Yamada et al. | 351/211 |
| 5,296,888 A | * | 3/1994 | Yamada | 396/51 |
| 5,570,151 A | * | 10/1996 | Terunuma et al. | 396/52 |
| 5,926,655 A | | 7/1999 | Irie et al. | |

FOREIGN PATENT DOCUMENTS

DE    1 920 893    8/1965
DE    31 35 950 A1    4/1982

(Continued)

OTHER PUBLICATIONS

English translation of International Preliminary Report on Patentability dated Nov. 27, 2008 for corresponding PCT application No. PCT/EP2007/003357.

(Continued)

*Primary Examiner* — William C Dowling
(74) *Attorney, Agent, or Firm* — Christie, Parker & Hale, LLP

(57) ABSTRACT

A viewfinder system for a camera, in particular a movie camera, in which there runs a viewfinder beam path that is diverted from a recording beam path for film exposure is provided. The viewfinder system comprising an eyepiece, an eye closure, a shutter for masking out stray light penetrating into the camera via the viewfinder system, and a control device that triggers the shutter and is connected to a sensor. The viewfinder system further comprising a sensor device for contactless detection of an eye or head, located at the eye closure of the viewfinder system, of a person viewing the picture to be recorded through the eyepiece.

37 Claims, 4 Drawing Sheets

FOREIGN PATENT DOCUMENTS

| | | |
|---|---|---|
| DE | 699 05 501 T2 | 7/2000 |
| EP | 1 147 606 B1 | 10/2001 |
| JP | 11-84471 | 3/1999 |
| JP | 2000-147602 | 5/2000 |

OTHER PUBLICATIONS

International Search Report, dated Oct. 12, 2007, corresponding to PCT/EP2007/003357.
Patent Abstracts of Japan, Publication No. 11084471 A, Published on Mar. 26, 1999, in the name of Tamura et al.
Patent Abstracts of Japan, Publication No. 2000147602, Published on May 26, 2000, in the name of Naikaido.

* cited by examiner

VIEWFINDER SYSTEM FOR A CAMERA

CROSS-REFERENCE TO A RELATED APPLICATION

This application is a National Phase Patent Application of International Patent Application Number PCT/EP2007/003357, filed on Apr. 11, 2007, which claims priority of German Patent Application Number 10 2006 018 865.9, filed on Apr. 13, 2006.

BACKGROUND

The invention relates to a viewfinder system for a camera, in particular for a movie camera.

In order to view a picture or a picture sequence to be recorded by a still camera, movie camera or videocamera, a viewfinder beam path is diverted from the recording beam path running through the camera objective by means of a beam splitter or a mirror reflex device and is imaged as viewfinder picture by a transmitting optics as a real image, for example on a focusing screen or fiber plate or as an air image, where it can be viewed through an eyepiece and assessed. The viewfinder closure of the camera is formed by an eye closure made from a soft plastic that is applied around the eye to the head of a cameraman and prevents laterally penetrating stray light from degrading the viewfinder image viewed. The eye closure can optionally be designed as an eyepiece cup anatomically adapted to the field of view of the cameraman, or in the manner of a bellows. Usually, a leather cloth is pulled over the anatomically shaped eyepiece cup or over the bellows in order to give a more pleasant contact with the skin.

If the eye of the cameraman is not located at the eye closure, stray light can penetrate into the camera interior via the viewfinder system of the camera in a direction opposite to the viewfinder rays diverted from the recording beam path, be reflected into the recording beam path at the rear side of the camera objective, or be scattered in the viewfinder beam path at the focusing screen or fiber plate, and thereby lead to faulty exposures of film or video pictures, and thus render the film or video recording unusable.

In order to avoid the penetration of stray light into the viewfinder system when a head is not applied at the eye closure, it is known to arrange between the eye closure and the eyepiece a shutter that is connected to a lever guided to the outside of the camera housing, such that the cameraman is able to open the shutter by manual actuation of the lever in order to view pictures with his head applied to the eye closure, and to close it again after viewing pictures but before moving his head from the eye closure. However, this known apparatus for preventing the penetration of stray light into the viewfinder system of a camera presupposes extreme concentration on the part of the cameraman, since premature opening or delayed closing of the shutter when no head is located at the eye closure allows stray light to penetrate into the viewfinder system of the camera and can lead to faulty exposures of the film or video.

For this reason, control apparatuses have been developed for a shutter arranged in the viewfinder system of a camera; with these apparatuses, the pressure of the head against the eye closure opens the shutter via a mechanism, and a spring connected to the mechanism closes the shutter when the cameraman no longer presses against the eye closure with his head. This apparatus for automatically opening and closing the shutter has the disadvantage, however, that pressure is continuously exerted on the field of view about the eye of the cameraman while images are being viewed, and this is felt as being unpleasant.

DE 31 35 950 A1 discloses an apparatus for reducing or masking out the quantity of parasitic light incident in a monocular mirror reflex viewfinder and which includes a light sensitive element that is arranged in the camera viewfinder and outputs a voltage as a function of the parasitic light entering through the eyepiece of the viewfinder. A comparator receives the output signal of the light sensitive element and generates a control signal as soon as the intensity of the parasitic light exceeds a predetermined value. A shutter is closed as a function of the control signal such that parasitic light does not scatter into the optical system of the camera through the viewfinder system and cannot degrade the image quality. Instead of the shutter, an aperture stop or a filter can be used in the known apparatus so that the cameraman can observe the object to be recorded through the viewfinder even when the parasitic light passing into the optical system of the camera is reduced.

So that in the case of the known apparatus for triggering a shutter arranged in the viewfinder beam path the viewfinder rays diverted from the recording beams are not received by the light sensitive element and therefore also lead to a closure of the shutter even when the eye of the cameraman is located at the camera viewfinder, there is provided in the eyepiece arrangement of the viewfinder system a small wall which occludes the viewfinder rays diverted from the recording beam path such that the light sensitive element in the form of a photodiode or of a phototransistor picks up only the parasitic light incident through the eyepiece. Despite this measure, given an appropriately set sensitivity of the device for triggering the shutter it is impossible to prevent the viewfinder rays from the end termination of the viewfinder from being reflected at the eye or the visual aid of the cameraman or at a lens, inserted into the viewfinder, for correcting vision defects, falling onto the light sensitive element and initiating a closure of the shutter even though the eye of the cameraman is located at the eye closure of the camera viewfinder.

A further disadvantage of the known apparatus consists in that given low illumination the shutter is open because of a lack of parasitic light incident in the camera viewfinder, and in the event of suddenly incident parasitic light, for example upon an interchange of light and shade, parasitic light is incident in the viewfinder system for a short time up to the closure of the shutter by a control signal output by the light sensitive element, and leads to faulty exposures.

Furthermore, given a minimum distance of the field of view, surrounding the eye of the cameraman, from the eye closure of the camera viewfinder, parasitic light can penetrate into the viewfinder system of the camera and lead to closure of the shutter given an appropriate setting of the sensitivity of the control device, even though the small quantity of parasitic light would not lead to faulty exposures. In order to enable images to be viewed even in such cases, the known apparatus requires a complicated adjustment of the response threshold of the device for triggering the shutter.

SUMMARY

It is an object of the present invention to specify a viewfinder system of the type mentioned at the beginning that does not exert pressure on the field of view during viewing of the image, prevents the penetration of stray light into the viewfinder system of a camera even when light is incident suddenly in the viewfinder system, does not respond to the viewfinder rays diverted from the recording beam path, and is of simple design and easy to adjust.

Since the shutter is always closed in the case of the inventive viewfinder system when the eye of the cameraman is not located at a prescribed distance from the eyepiece, viewfinder or eye closure, even a sudden incident of stray light in the viewfinder system cannot lead to faulty exposures. Since, furthermore, the control device for triggering the shutter is oriented solely to detecting the eye, the viewfinder rays diverted from the recording beam path do not influence the triggering of the shutter, and the response threshold of the control device can be adjusted exclusively to the interocular distance such that a quantity of stray light still just permissible can be set exactly and with simple means, and thus the entire apparatus for preventing the penetration of stray light into the viewfinder system of the camera can be of simple design.

Since the control device cooperates with a sensor device operating in a contactless fashion, not only is it possible to permit the penetration of stray light that does not lead to faulty exposures by means of a short distance of the field of view of the viewer from the eye closure, but there is also no pressure of any kind exerted on the field of view of the cameraman while he is viewing pictures.

In a first exemplary variant of the inventive solution, a capacitive or inductive sensor is provided for detecting the capacitance or inductance changed by the approach of the eye to the eye closure, and for outputting a sensor signal to the control device.

This sensor device operating in a contactless fashion detects changes in capacitance between the two electrodes of a capacitor, or changes in inductance in the magnetic field of a coil when a body part is located at the eye closure, and can, for example, be set such that the shutter is opened only when the field of view of the cameraman that surrounds the eye is applied in a lightproof fashion at the eye closure.

In a second exemplary variant of the inventive solution, the sensor device consists of a transmitter that outputs signals, directed into the eye closure, with wavelengths that lie outside the wavelength of visible light, and a receiver that is tuned to the signals output by the transmitter, receives the signals reflected by the eye or the field of view surrounding the eye, and outputs sensor signals to the control device as a function of the signal reception.

Configuring the sensor device as a transceiving device firstly enables a miniaturized design of the sensor device and its arrangement in a region of the viewfinder system, or the eye closure, that does not disturb viewing of the pictures and, secondly, ensures reliable detection of the eye of a picture viewer at, or at a prescribable distance from, the eye closure. Furthermore, this sensor device operating in a contactless fashion can be adjusted very sensitively such that it is possible to class as still just tolerable even small quantities of stray light that still do not lead to closure of the shutter, in particular if the user wishes to avoid touching the eyepiece cup and prefers to keep a minimum gap between head and eyepiece cup.

Since the signals output by the transmitter have wavelengths that lie outside the wavelengths of visible light, the measuring beams retroreflected by the eye of the picture viewer into the viewfinder system cannot lead to faulty exposures of the film or videotape, or to irritation of the eye of the user.

In an exemplary embodiment, the transceiving device of the sensor device is designed as a reflected light barrier and, in particular, as an infrared reflected light barrier, that emits and receives very short light flashes.

With reference to the wavelength, the measurement signals lying in the infrared region differ substantially from the wavelengths of visible light, and thereby enable simple tuning. Moreover, they are invisible to the picture viewer and can therefore not disturb or influence the viewing of the pictures. Owing to the restriction of the measurement signals output by the transmission part to very short light flashes with a frequency in the kHz region, the eye of the viewer is, in addition, loaded only in a fashion that is negligible and far below permissible limiting values. Moreover, the electronic evaluation of the control device pays heed solely to a receiver signal that is correlated temporally with the emission of the light flashes so as to effectively exclude the shutter from responding to stray light.

A number of sensors arranged distributed on the circumference of the viewfinder closure ensure a uniform and complete detection of a cameraman looking into the viewfinder, it being preferred to arrange two sensors diametrically relative to one another on the circumference of the viewfinder closure.

In one exemplary configuration of the inventive solution, the sensors have at least one light emitting diode as transmitter, and at least one photodiode or one phototransistor as receiver; in each case two light emitting diodes and a photodiode or a phototransistor preferably form a sensor, the photodiode or the phototransistor being arranged between the light emitting diodes.

Owing to the redundant arrangement of in each case two light emitting diodes, the fault tolerance is raised and a uniform distribution is ensured for the measurement signals output by the sensors and preferably lying in the infrared region. Additionally, the presence of the user is reliably detected even when he looks into the eye closure from an unusual angle.

The control device is connected to a driving device, which actuates the shutter, and to a device for setting the response threshold for activating the driving device.

The drive for actuating the shutter can be of any desired design and consists, for example, of a miniature motor with a gear or lifting mechanism for opening and closing the shutter. The connection of the control device to a device for setting the response threshold for activating the driving device enables the setting of the desired switching distance at which the shutter is intended to operate as a function of the film sensitivity and ambient brightness, since some users avoid skin contact with the eyepiece cup and, instead of this, keep their head at a minimum distance from the latter.

The driving device exemplary consists of a lifting magnet whose armature is connected to the shutter, and whose winding or windings is or are connected to a control output of the control device.

This configuration of the driving device enables extremely short reaction times for opening and closing the shutter upon outputting of an appropriate control signal by the control device, is of very simple design and has an only very slight energy demand.

In a further exemplary refinement of the invention, there are integrated into the eye closure heating elements that prevent misting of the eyepiece when the camera is located in cold surroundings and the picture viewer or cameraman is looking into the camera viewfinder.

It is additionally possible to provide a multistage switch with an automatic position, in which the shutter is opened or closed as a function of the detection of an eye or head of a user, with an open position, in which the shutter is permanently open independently of the detection of an eye or head of a user, and with a closed position, in which the shutter is permanently closed independently of the detection of an eye or head of a user.

Such a multistage switch enables a deactivation of the automatic function for special applications of the camera, and can preferably be combined with that for switching in the heating elements integrated into the eye closure.

A method for preventing the penetration of stray light into the viewfinder system of a camera, in particular a movie camera, in the case of which a viewfinder beam path diverted from a recording beam path for film exposure runs in the viewfinder system, and that includes an eyepiece, an eye closure and a control device that triggers the shutter and is connected to a sensor is characterized in that the presence of an eye or head of a person at the eye closure is detected in a contactless fashion, and the shutter is opened given a prescribed measure of covering of the eye closure.

The contactless detection of the presence of an eye or head of a person at the eye closure can be performed by detecting the capacitance or inductance in the region of the eye closure, and the shutter is opened or closed in the event of a changing capacitance or inductance as the eye or head of a person approaches the eye closure.

Alternatively, measurement signals directed into the open region of the eye closure can be output with wavelengths that lie outside the wavelength of visible light, the signals reflected by the eye or head of a person being received and evaluated, and the shutter being opened or closed as a function of the evaluation of the reflected signals.

In order to prevent faulty opening of the shutter because of the penetration of stray light into the eye closure, it is preferred to carry out a measuring cycle in which the reflected signals are measured before, during and after the output of the measurement signals, and the received reflected signals of the measuring cycle are compared with one another and the shutter is opened or closed as a function of the comparison.

If the middle measurement, performed during the output of a measurement signal, of the reflected signal does not differ significantly from the two measurements before and after the output of the measurement signal, this indicates that stray light has been detected in the measurement before and after the output of the measurement signal, since no measurement signal has been output at these instances. Only if the middle measurement of the measurements before and after the output of the measurement signal differs significantly from the two further measurements are the preconditions for opening the shutter present.

BRIEF DESCRIPTION OF THE DRAWINGS

The aim is to explain the fundamental idea of the invention in more detail with the aid of an exemplary embodiment illustrated in the figures, in which.

DETAILED DESCRIPTION

Figure 1:
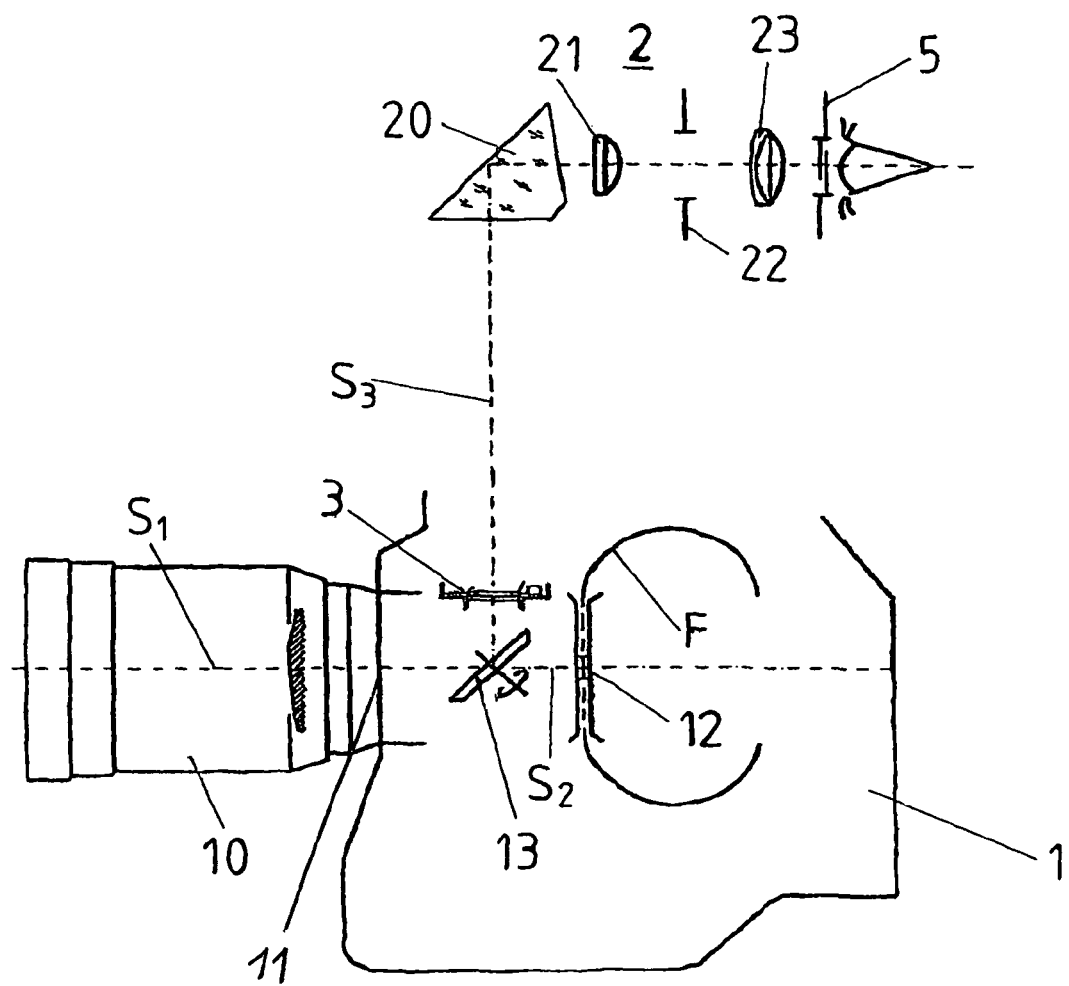
FIG. 1 shows a schematic of the film recording beam path of a movie camera, and of a viewfinder beam path diverted therefrom into the viewfinder system of the movie camera.

FIG. 1 shows a partially cutaway side view of a movie camera, with a schematic of the beam paths of the movie camera. The movie camera includes a partially cutaway camera housing 1 with an objective carrier 11 for fixing an objective 10, and a film gate 12 in the interior of the camera housing 1, past which a movie film F is intermittently moved.

A rotating mirror shutter 13 periodically releases the film recording beam path S1, which is incident through the objective 10, as film exposure beam path S2 for the purpose of exposing a film image, at rest in the film gate 12, of the movie film F, or reflects the film recording beam path S1 as viewfinder beam path S3 into a viewfinder system 2 during the film transport. Arranged in the viewfinder beam path S3 at the plane which is optically identical to the image plane at the film gate 12 is an apparatus for viewing images or assessing images that consists of a focusing screen or fiber plate 3 onto which an image of the object to be recorded is reflected when the reflecting surface of the rotating mirror shutter 13 is located in the film recording beam path S1, while the film transport mechanism transports the movie film F further in the film gate 12 by a film image.

The viewfinder beam path S3 is guided by means of a deviating prism 20 in a direction suitable for viewing images and assessing images, and imaged by a transmitting optics 21 as a real viewfinder image in the plane of a field stop 22, where it can be viewed through an eyepiece 23.

Figure 2:
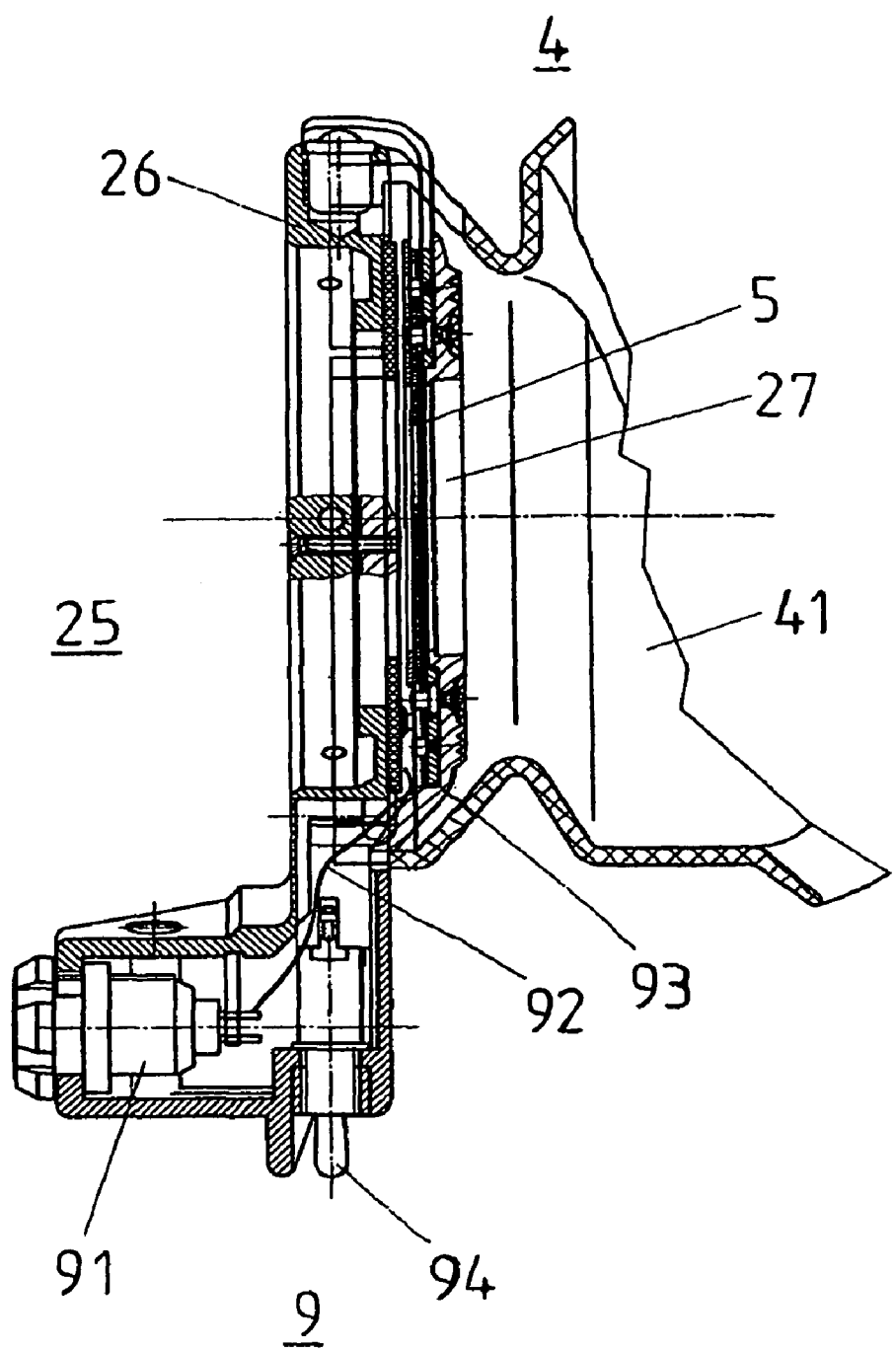
FIG. 2 shows a longitudinal section through the viewfinder closure of the viewfinder system having an eye closure, designed as an eyepiece cup, and a shutter.
Figure 3:
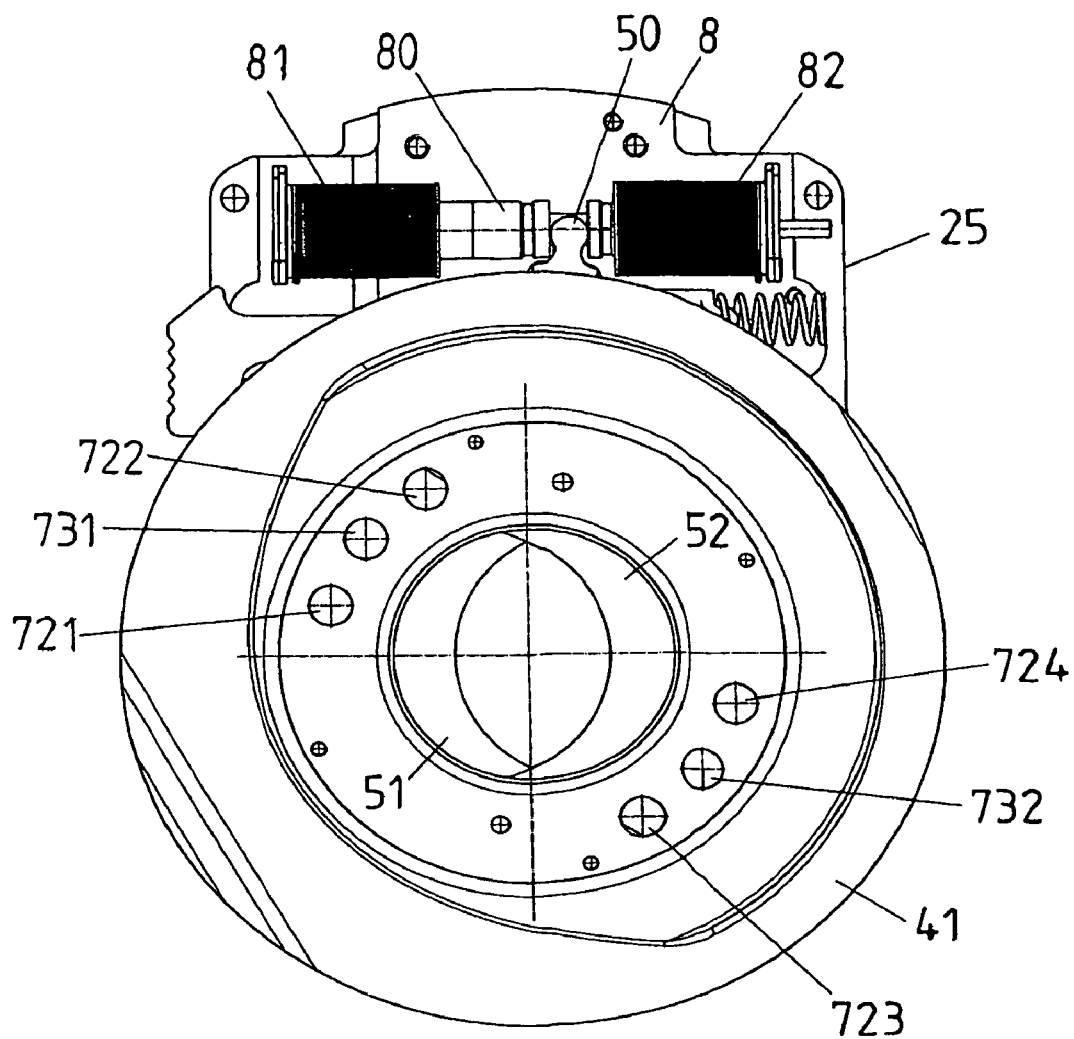
FIG. 3 shows a plan view of the viewfinder closure with a lifting magnet for actuating the shutter, and sensors for detecting a user.
Figure 4:
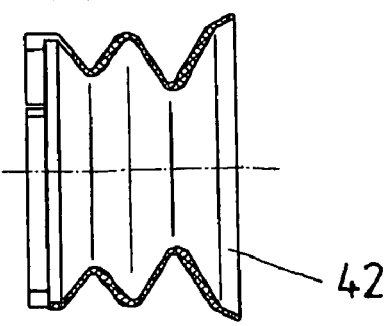
FIG. 4 shows an individual illustration of an eye closure designed as a bellows.

The viewfinder closure 25, illustrated in FIGS. 2 and 3 in longitudinal section and in a plan view from the user side, of the viewfinder system 2 includes an eye closure 4 that consists in FIG. 2 of an eyepiece cup 41 that is anatomically adapted to the field of view around the eye of a picture viewer or cameraman and can be replaced in accordance with the individual illustration in FIG. 4 by an eye closure 4 designed as a bellows 42. The viewfinder closure 25 further has a coupling, 26 for connecting the viewfinder closure 25 to the camera viewfinder including the deviating prism 20, the transmitting optics 2, the field stop 22 and the eyepiece 23, an optical lens holder 27 for holding a correction lens that compensates vision defects of the picture viewer, and a heater 9 for heating the viewfinder closure 25 and/or the lens holder 27 that prevents misting of the eyepiece 23 when the movie camera is located in cold surroundings and the picture viewer or cameraman is looking into the viewfinder.

The heater 9 has a number of heating elements 93 that are let into the lens holder 27 or the viewfinder closure 25, or are mounted on the surface thereof, and which are connected via an electric line 92 and a switch 94 to a plug 91 that serves to switch the heater 9 on and off and can be connected to the power supply of the movie camera.

When the cameraman removes his eye from the eye closure 4, it is possible for there to enter into the viewfinder system 2 of the movie camera light that, as stray light, pass in the direction opposite to that of the viewfinder beam path S3 into the film recording beam path S1 and thus, via the film exposure beam path S2, onto the film F to be exposed, and thereby make film images unusable. In this case, depending on the sensitivity of the film F and the brightness of the object to be recorded even small quantities of stray light suffice to make the corresponding film section unusable.

Figure 5:
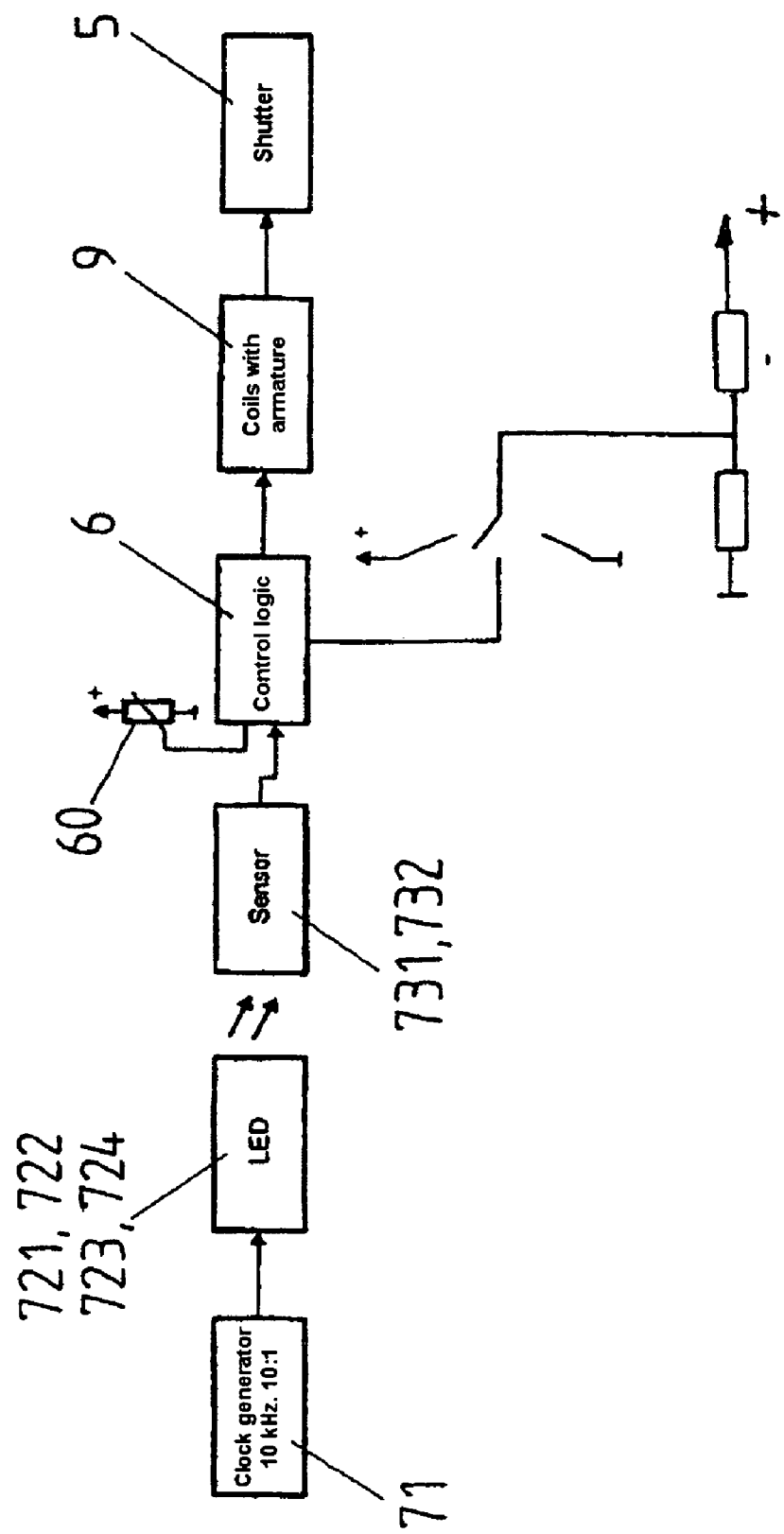
FIG. 5 shows a block diagram of the sensor and control device for triggering the shutter.

Provided in the viewfinder closure 25 for the purpose of blocking such incidence of stray light is a shutter 5 whose shutter blades 51, 52 are connected in accordance with FIG. 3 to a driving device 8 that is triggered by a control device 6 in accordance with FIG. 5. The control device 6 is, in turn, connected to a sensor device that is aligned with the eye or the head of a picture viewer or cameraman, and detects the presence or, if appropriate, the distance of an eye or head from the eye closure 4, and outputs a sensor signal to the control device 6 that, upon detection of the eye of the picture viewer or cameraman, triggers the driving device 8 to open the shutter 5, or closes the shutter 5 when the eye or the head of the picture viewer or cameraman is removed from the eye closure by a prescribed measure.

In accordance with the plan view of the viewfinder closure 25 illustrated in FIG. 3, the sensor device includes, seen from the viewer side, two sensors arranged diametrically relative to one another on the circumference of the viewfinder opening and respectively having two light emitting diodes 721, 722 and 723, 724 respectively, and a photodiode or a phototransistor 731, 732 arranged between the light emitting diodes 721, 722, 723, 724. In accordance with the block diagram illustrated in FIG. 5, the sensor device has a clock generator 71 that reduces a clock frequency of 10 kHz in the ratio of 10:1 and drives the light emitting diodes 721, 722, 723, 724, which output short light flashes 74, preferably in the infrared region, into the eye closure 4, that is to say in the direction of an eye adjacent to the eye closure 4. The photodiodes or the phototransistor 731, 732 receive the light flashes 74 output by the light emitting diodes 721, 722, 723, 724 and, upon reception, output a sensor signal to an input of the control device 6.

The light emitting diodes 721, 722 and 723, 724, respectively, and the photodiodes or phototransistors 731, 732 are preferably arranged and designed as infrared reflected light barriers that output very short infrared light flashes and are tuned to reception of these very short infrared light flashes. This results neither in an impairment of picture viewing nor in the corruption of the measurement by reflections in the region of the eye closure, and has the effect that the loading of the eye of the viewer is negligibly small and is a factor of 10 below the permissible eye loading. Moreover, a reliable distinction is made during the evaluation between desired light flashes and undesired stray light owing to clocked light signals. The evaluation circuit measures the signal of the sensor before the emission of the light flashes, during the emission of the light flashes and after the emission of the light flashes. If no significant brightness differences occur at the sensor during the three measurements, it is possible to conclude unambiguously that stray light is present in the region of the eye closure. If, by contrast, the detected measured value of the reflected signal is significantly higher during the emission of the light flashes than therebefore and thereafter, the condition for opening the shutter is fulfilled.

The control device 6 is connected on the input side to a potentiometer 60 for setting a response threshold. On the output side, the control device 6 is connected to the driving device 8 that, in the preferred embodiment illustrated in FIG. 3, consists of a lifting magnet whose windings 81, 82 are connected to the trigger output of the control device 6, and whose armature 80 is coupled via a pivoted lever 50 to the blades 51, 52 of the shutter 5 such that, given a control voltage output by the output of the control device 6, the armature 80 of the lifting magnet is picked up and the shutter 5 is closed or opened in the opposite sense.

A contact coupled to the lifting magnet or the shutter 5 sends feedback to an input of the control device 6 in order to specify the open or closed state of the shutter 5.

It is possible in addition to provide a multistage switch (not illustrated in the drawing) that renders it possible to switch off the automatic shutter and to keep the shutter permanently open or permanently closed. For this purpose, the multistage switch has an "ON" switch position for the permanently open position of the shutter, an "OFF" switch position for the permanently closed position of the shutter, and an "AUTOMATIC" switch position for activating the automatic shutter. In addition, the multistage switch can be combined with the switch 94 for the eyepiece cup heater 9 so that only one switch is provided at the viewfinder closure 25.

The invention claimed is:

1. A viewfinder system for a movie camera, in which there runs a viewfinder beam path that is diverted from a recording beam path for film exposure, said camera having an eyepiece, an eye closure, a shutter for masking out stray light penetrating into the camera via the viewfinder system, and a control device that triggers the shutter and is connected to a sensor, said system further comprising a sensor device for contactless detection of an eye or head, located at the eye closure of the viewfinder system, of a person viewing the picture to be recorded through the eyepiece, wherein the sensor device comprises at least one transmitter that outputs signals, directed into the eye closure, with wavelengths that lie outside the wavelength of visible light, and at least one receiver that is tuned to the signals output by the transmitter, receives the signals reflected by the eye or head, and outputs sensor signals to the control device as a function of the signal reception.

2. The viewfinder system of claim 1, wherein the sensor device comprises a reflected light barrier.

3. The viewfinder system of claim 1, further comprising a reflected light barrier, wherein the reflected light barrier is designed as an infrared reflected light barrier.

4. The viewfinder system of claim 3, wherein the infrared reflected light barrier emits and receives very short light flashes.

5. A viewfinder system for a movie camera, in which there runs a viewfinder beam path that is diverted from a recording beam path for film exposure, said camera having an eyepiece, an eye closure, a shutter for masking out stray light penetrating into the camera via the viewfinder system, and a control device that triggers the shutter and is connected to a sensor, said system further comprising a sensor device for contactless detection of an eye or head, located at the eye closure of the viewfinder system, of a person viewing the picture to be recorded through the eyepiece, wherein a number of sensors are arranged on a circumference of the viewfinder closure.

6. The viewfinder system of claim 5, wherein two sensors are arranged diametrically relative to one another on the circumference of the viewfinder closure.

7. The viewfinder system of claim 5, wherein the sensors have at least one light emitting diode as a transmitter, and at least one photodiode or one phototransistor as receiver.

8. The viewfinder system of claim 7, wherein in each sensor comprises two light emitting diodes and a photodiode or a phototransistor.

9. The viewfinder system of claim 8, wherein the photodiode or the phototransistor is arranged between the light emitting diodes.

10. The viewfinder system of claim 1, wherein the control device is connected to a driving device, which actuates the shutter, and to a device for setting a response threshold for activating the driving device.

11. The viewfinder system of claim 10, wherein the driving device comprises a lifting magnet whose armature is connected to the shutter, and whose winding or windings is or are connected to a control output of the control device.

12. A viewfinder system for a movie camera, in which there runs a viewfinder beam path that is diverted from a recording beam path for film exposure, said camera having an eyepiece, an eye closure, a shutter for masking out stray light penetrating into the camera via the viewfinder system, and a control device that triggers the shutter and is connected to a sensor, said system further comprising a sensor device for contactless detection of an eye or head, located at the eye closure of the viewfinder system, of a person viewing the picture to be recorded through the eyepiece, further comprising a heater integrated into the eye closure.

13. A viewfinder system for a movie camera, in which there runs a viewfinder beam path that is diverted from a recording beam path for film exposure, said camera having an eyepiece, an eye closure, a shutter for masking out stray light penetrating into the camera via the viewfinder system, and a control device that triggers the shutter and is connected to a sensor, said system further comprising a sensor device for contactless detection of an eye or head, located at the eye closure of the viewfinder system, of a person viewing the picture to be recorded through the eyepiece, further comprising a multistage switch with an automatic position, in which the shutter is opened or closed as a function of the detection of an eye or head of a user, with an open position, in which the shutter is permanently open independently of the detection of an eye or head of a user, and with a closed position, in which the shutter is permanently closed independently of the detection of an eye or head of a user.

14. A method for preventing the penetration of stray light into a viewfinder system of a movie camera having a viewfinder beam path diverted from a recording beam path for film exposure, an eyepiece, an eye closure, a shutter for masking out stray light penetrating into the camera via the viewfinder system, and a control device that triggers the shutter and is connected to a sensor, wherein the presence of an eye or head of a person at the eye closure is detected in a contactless fashion, and the shutter is opened given a prescribed measure of covering of the eye closure, and wherein measurement signals directed into the open region of the eye closure are output with wavelengths that lie outside a wavelength of visible light, and wherein the signals reflected by the eye or head of a person are received and evaluated, and the shutter is opened or closed as a function of the evaluation of the reflected signals.

15. The method of claim 14, comprising a measuring cycle in which the reflected signals are measured before, during and after the output of the measurement signals, and the received reflected signals of the measuring cycle are compared with one another and the shutter is opened or closed as a function of the comparison.

16. The method of claim 15, wherein the shutter is opened or closed only whenever a middle measurement of the measuring cycle differs significantly from two other measurements.

17. A viewfinder system for a movie camera, in which there runs a viewfinder beam path that is diverted from a recording beam path for film exposure, said camera having an eyepiece, an eye closure, a shutter for masking out stray light penetrating into the camera via the viewfinder system, a sensor device for contactless detection of an eye or head of a person viewing the picture to be recorded through the eyepiece, and a control device for triggering the shutter and being connected to said sensor device, said sensor device being located at the eye closure of the viewfinder system, said sensor device comprising a transmitter that outputs signals, and a receiver that is tuned to the signals output by the transmitter and that receives signals reflected by the eye or a field of view surrounding the eye, and outputs sensor signals to said control device as a function of the signal reception indicating an approach of the eye or head of the person to the eye closure.

18. The viewfinder system of claim 17, wherein said sensor is a capacitive or inductive sensor for detecting the capacitance or inductance changed by the approach of the eye or head to the eye closure.

19. The viewfinder system of claim 17, wherein said sensor device comprises at least one transmitter that outputs signals, directed into the eye closure, with wavelengths that lie outside the wavelength of visible light, and at least one receiver that is tuned to the signals output by the transmitter, receives the signals reflected by the eye or head, and outputs sensor signals to the control device as a function of the signal reception.

20. The viewfinder system of claim 19, wherein the sensor device comprises a reflected light barrier.

21. The viewfinder system of claim 20, wherein the reflected light barrier is designed as an infrared reflected light barrier.

22. The viewfinder system of claim 21, wherein the infrared reflected light barrier emits and receives very short light flashes.

23. The viewfinder system of claim 17, wherein a number of sensors are arranged on the circumference of said viewfinder closure.

24. The viewfinder system of claim 23, wherein two sensors are arranged diametrically relative to one another on the circumference of the viewfinder closure.

25. The viewfinder system of claim 23, wherein the sensors have at least one light emitting diode as a transmitter, and at least one photodiode or one phototransistor as receiver.

26. The viewfinder system of claim 25, wherein each sensor comprises two light emitting diodes and a photodiode or a phototransistor.

27. The viewfinder system of claim 26, wherein the photodiode or the phototransistor is arranged between the light emitting diodes.

28. The viewfinder system of claim 17, wherein the control device is connected to a driving device, which actuates the shutter, and to a device for setting a response threshold for activating the driving device.

29. The viewfinder system of claim 28, wherein the driving device comprises a lifting magnet whose armature is connected to the shutter, and whose winding or windings is or are connected to a control output of the control device.

30. The viewfinder system of claim 17, further comprising a heater integrated into the eye closure.

31. The viewfinder system of claim 17, wherein the eye closure comprises an anatomically shaped eyepiece cup or a bellow.

32. The viewfinder system of claim 17, further comprising a multistage switch with an automatic position, in which the shutter is opened or closed as a function of the detection of an eye or head of a user, with an open position, in which the shutter is permanently open independently of the detection of an eye or head of a user, and with a closed position, in which the shutter is permanently closed independently of the detection of an eye or head of a user.

33. A method for preventing the penetration of stray light into a viewfinder system of a movie camera having a viewfinder beam path diverted from a recording beam path for film exposure, an eyepiece, an eye closure, a shutter for masking out stray light penetrating into the camera via the viewfinder system, wherein the presence of an eye or head of a person at the eye closure is detected in a contactless fashion by a transmitter and sensor assembly which is arranged on a circumference of a viewfinder closure of said viewfinder system and which outputs a sensor signal to a control device that triggers the shutter which is opened given a prescribed measure of covering of the eye closure.

34. The method of claim 33, wherein a capacitance or inductance is detected in the region of the eye closure, and the shutter is opened or closed in the event of a changing capacitance or inductance as the eye or head of a user approaches or recedes from the eye closure.

35. The method of claim 33, wherein measurement signals directed into the open region of the eye closure are output with wavelengths that lie outside a wavelength of visible light, and in that the signals reflected by the eye or head of a person are received and evaluated, and the shutter is opened or closed as a function of the evaluation of the reflected signals.

36. The method of claim 35, comprising a measuring cycle in which the reflected signals are measured before, during and after the output of the measurement signals, and the received reflected signals of the measuring cycle are compared with one another and the shutter is opened or closed as a function of the comparison.

37. The method of claim 36, wherein the shutter is opened or closed only whenever a middle measurement of the measuring cycle differs significantly from two other measurements.

* * * * *

UNITED STATES PATENT AND TRADEMARK OFFICE
CERTIFICATE OF CORRECTION

| | | |
|---|---|---|
| PATENT NO. | : 8,070,292 B2 | Page 1 of 1 |
| APPLICATION NO. | : 12/226336 | |
| DATED | : December 6, 2011 | |
| INVENTOR(S) | : Klaus Jacumet | |

It is certified that error appears in the above-identified patent and that said Letters Patent is hereby corrected as shown below:

In the Claims:

Column 8, Claim 8, line 45.          Delete "in"

Signed and Sealed this
Tenth Day of July, 2012

David J. Kappos
*Director of the United States Patent and Trademark Office*